United States Patent Office 3,333,993
Patented Aug. 1, 1967

3,333,993
PRODUCTION OF THIN, ORIENTED SILICON-IRON WHEREIN GRAIN GROWTH INHIBITOR IS ADDED TO PRIMARY RECRYSTALLIZATION HEAT TREATMENT ATMOSPHERE AS FUNCTION OF Mn CONTENT AND FINAL THICKNESS
Dale M. Kohler, Middletown, Ohio, assignor to Armco Steel Corporation, Middletown, Ohio, a corporation of Ohio
Filed Apr. 2, 1965, Ser. No. 445,146
11 Claims. (Cl. 148—113)

ABSTRACT OF THE DISCLOSURE

A process for the manufacture of cube-on-edge oriented silicon-iron stock in thicknesses of 7 mils and less, including the steps of hot reducing the silicon-iron, removing scale, cold rolling to final gauge, and subjecting the stock to a final anneal consisting of a primary grain growth stage and a secondary grain growth stage. A grain growth inhibitor is provided in the environment of the stock and is caused to be diffused into the grain boundaries thereof during the primary grain growth stage of the final anneal, whereby to favor the growth of cube-on-edge nuclei during the secondary grain growth stage. The inhibitor is chosen from the class consisting of sulfur, selenium and compounds thereof, and is adjusted in quantity to the manganese content and final thickness of the stock.

---

Figure 1:
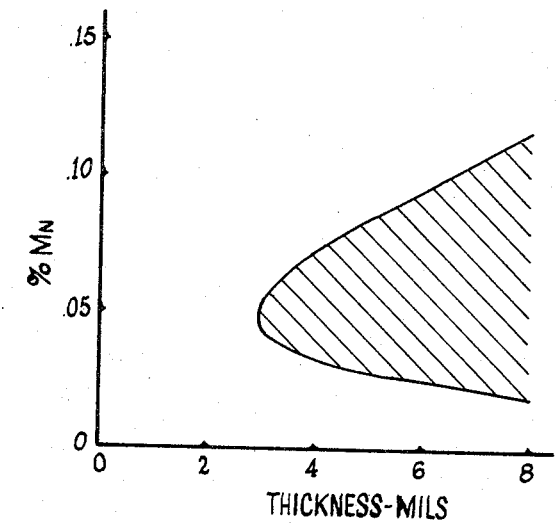

This is a continuation-in-part of the copending application in the name of the same inventor, entitled, Production of Oriented Silicon-Iron, Ser. No. 378,823, filed June 29, 1964.

This invention relates to the manufacture of polycrystalline grain oriented iron silicon alloys having a majority of the grains oriented in the (110)[001] or cube-on-edge crystalline orientation. It further relates to the development of the cube-on-edge texture by a process of grain boundary energy driven secondary grain growth in the thickness range of less than 1 to about 7 mils.

Silicon-iron alloys having the cube-on-edge grain orientation were first produced by Goss, as in U.S. Patent 1,965,559. The orientation provided by Goss enabled later investigators to produce the (110)[001] crystalline orientation by a process of grain boundary driven secondary grain growth in the thickness range substantially greater than 7 mils and up to about 25 mils. The normal practical thickness range for the method as described by Goss was 12 to 14 mils for technical reasons to be described.

It was evident to the earlier investigators of the Goss method that such material could not be commercially marketed because no step was provided in the process to remove the carbon present in all commercially produced material. The residual carbon resulted in harmful magnetic aging. It was also evident that the secondary recrystallization which is responsible for the high degree of grain orientation would not occur in a dependable and reproducible manner if product thicknesses much below about 12 mils were desired.

The process of wet hydrogen decarburization described by Carpenter and Jackson in U.S. Patent 2,287,467 solved the problem of carbon removal and allowed for rapid advances in commercial production. Many other improvements were developed, all aimed at producing a more dependable secondary grain growth and hence an improvement in the magnetic properties. The work of Cole and Davidson disclosed in U.S. Patent 2,158,065 provided the basic two-stage process used for commercial production of grain oriented silicon-iron. A great improvement in the vigor and completeness of secondary grain growth in commercial silicon-iron was made by Littmann and Heck and described in U.S. Patent 2,599,340. It was found that obtaining a vigorous secondary grain growth is dependent upon having a very fine dispersion of manganese sulfide or other suitable second-phase material capable of inhibiting primary grain growth in the temperature range from about 1000° F. up to about 1700° F. Thereafter it is possible for the cube-on-edge nuclei, whose energy allows them to break away from the restraint provided by the dispersion of manganese sulfide, to develop rapidly into large secondary crystals growing at the expense of the less perfectly oriented matrix of primary grains.

Effective amounts of manganese and sulfur have been obtained in silicon-iron by commercial melting practices since the work of Goss, even though the earlier investigators did not realize their function. The process of Littmann and Heck improved the dispersion of the manganese sulfide phase by dissolving the large inclusions of this constituent during a high temperature heating of the ingot or slab and then re-precipitating them during the hot rolling operation.

These improvements along with optimization of the manganese and sulfur contents of the melt and close control of intermediate thickness and process anneals have recently permitted the commercialization of a product as thin as 11 mils.

It had been determined from laboratory investigations that the primary reason for difficulty in obtaining boundary driven secondary grain growth in thin gauges is that the dispersion of manganese sulfide provided in the conventional manner is not sufficient to inhibit the primary growth in thinner gauges.

Attempts have been made to produce thin cube-on-edge oriented products by boundary driven secondary grain growth, such as the method taught by Fitz in U.S. Patent 2,913,361. In this method abnormally high quantities of manganese and sulfur are added to the melt in the attempt to provide additional inhibiting power for the primary grains. This process has failed to become commercially important because the increased concentration of this second-phase makes it more difficult to obtain the correct dispersion necessary for best results and also increases problems in removing all traces of sulfur remaining in the steel after the final box anneal.

In further attempts to produce thin gauge cube-on-edge silicon-iron, investigators have resorted to mechanisms for texture development other than the conventional boundary driven grain growth. Walter in U.S. Patent 3,105,782 teaches a method of producing the cube-on-edge orientation by surface energy in an extremely pure alloy having a very clean and bright surface. Albert and Foster in U.S. Patent 3,165,428 also teach a method for obtaining cube-on-edge orientation by surface energy, again involving very pure starting materials and a clean and bright surface in the final anneal. Neither of these processes has been commercialized because of the high cost involved in the pure starting material and in attaining the non-contaminating conditions for the surface energy final anneal.

Littmann in U.S. Patent 2,473,156 worked out a procedure in which fully developed cube-on-edge orientation commercially produced at a thickness of 12 to 14 mils could be cold rolled to a thickness of 0.5 to 7 mils and then annealed to obtain primary recrystallization of an orientation approximating (120)[001]. This final orientation, like the (110)[001], has the cube edges in the rolling direction and is hence magnetically useful. The Littman process, while being fully exploited commercially, produces a product having two disadvantages. The first is that the low temperature short time anneal used to produce primary recrystallization did not form a glass on the surface for electrical resistivity. This necessitates the application of a coating for electrical resistivity. Such coatings usually have a phosphate base which is easily reduced in the stress relief anneal, which is ordinarily practiced by a manufacturer of electrical equipment after the material has been cold worked as by stamping out laminations or winding a core, thus decreasing its interlaminar resistivity. The second is that upon stress relief annealing an undesirable type of secondary recrystallization can set in at temperatures as low as 1350° F. and destroy the desirable orientation of the primary grains. The method is incapable of producing favorable secondary grain growth in the material.

In the copending application, of which this is a continuation-in-part, as set forth above, a method is taught whereby substantial quantities of a grain growth inhibitor may be diffused directly into the boundaries of the silicon-iron during the primary stage of the final anneal. It is shown that nearly all of the inhibitor added by this boundary diffusion method is located at the grain boundaries since diffusion through the bulk of the primary crystal is extremely slow. Thus a small addition to the boundaries directly is more effective in inducing secondary grain growth by boundary energy than is a much larger addition to the melt.

It is an object of this invention to provide a simplified and less expensive process of producing the cube-on-edge or (110) [001] texture in thicknesses of less than 1 and up to about 7 mils in silicon-iron alloys by grain boundary energy grain growth.

It is also an object of this invention to produce thin gauge oriented materials by secondary grain growth in such a way that the optimum characteristics of the final material are not likely to be impaired by stress relieving anneals as practiced by the manufacturer after punching or winding and the like.

Another object of the invention is to provide thin gauge cube-on-edge silicon-iron which as produced carries a thin coating of glass for interlaminar resistivity.

It is a further object of the invention to produce thin gauge cube-on-edge silicon-iron by a process comprising fewer necessary steps.

Yet another object of the invention is to provide a process for producing thin gauge cube-on-edge silicon-iron having superior magnetic qualities.

It is still another object of the invention to provide a process for manufacture of the (110) [001] texture in thicknesses of about ½ to 7 mils from starting material of normal open hearth purity.

These and other obejcts of the invention which will be set forth hereinafter or will be apparent to one skilled in the art upon reading these specifications are accomplished by a series of process steps of which certain exemplary embodiments will now be described. Reference is made to the accompanying drawings wherein:

FIGS. 1 through 5 inclusive are respectively charts showing areas of satisfactory secondary grain growth wherein percent manganese in the silicon-iron is plotted against thicknesses of the sheet material in mils at given percentages of sulfur added to the annealing separator.

It is believed that the several two-dimensional charts forming FIGS. 1 through 5 in this case make a clearer showing than would be made by three-dimensional charts relating both manganese and sulfur contents to the thickness of the material.

In the present invention use is made of sulfur or decomposable sulfur compounds in a way generally analogous to that set forth in the copending application of which this case is a continuation-in-part. The silicon-iron starting materials employed herein will contain roughly from 2% to 3.5% silicon. They would ordinarily not contain more than about 0.3% carbon, and it is preferred to have the carbon content at a lower value, say down to about .02%. They may contain from about .01% to about .15% of manganese with about .03% to .10% preferred. They may initially contain from .01% or less to .03% or more of sulfur although a high sulfur content within this range is not necessary or desirable. Elements such as phosphorus and other impurities commonly found in silicon-irons may be present in normal amounts. The remainder of the metal may be substantially all iron with about .002% or less to about .006% oxygen.

The above may be regarded as a ladle analysis; and it will be evident that the starting material may be made by any of the known processes for producing silicon-iron of this analysis, such as the use of the basic open hearth procedure or any of the oxygen-blowing techniques. The silicon may be added in the furnace or in the ladle or runner as known in the art.

Sulfur has a tendency to inhibit undue grain growth during primary recrystallization anneals. But it is possible to lose sulfur from the grain boundaries in uncontrollable amounts during the processing from the ingot to the final gauge. For the purposes of this invention (as also set forth in the parent case) sulfur is added to the silicon-iron at final gauge before the primary grain structure has a chance to undergo normal grain growth during the primary recrystallization.

In the practice of the present process it is essentially immaterial whether the ingots or slabs are hot rolled from a higher initial temperature since the sulfide distribution is of much less importance and is controlled in a new way. Also, the use of atmospheres which tend to deplete the sulfur content in intermediate annealing steps, while not recommended, will not prevent the attainment of the desired orientation and grain size in the final product of this invention.

The sulfur may be added in the ways set forth in the copending application. The invention can be practiced by the formation on or addition to the metal surface of ferrous sulfide, or the addition of sulfur compounds to the annealing separator employed during the final heat treatment. The sulfur compounds will decompose during the anneal. Elemental sulfur can also be added to the separator for the same purpose.

The preferred annealing separators, to which sulfur or sulfur compounds are added, are magnesia, alumina and calcium oxide or mixtures of these, in finely divided form. Other substances may be used, if desired, such as titania and other refractory metal oxides.

It is believed that the sulfur or sulfur compound reacts with the dry hydrogen annealing atmosphere to form hydrogen sulfide and that the sulfur is transferred to the steel by means of the hydrogen sulfide as a carrier, and reacts with the steel to form sulfides at the grain boundaries. The reaction occurs between about 1000° F. and about 1800° F. However, the process can be performed in a vacuum and does not require a gas carrier. Other sulfur transferring methods may also be used provided the sulfur reaches the grain boundaries. The absorption creates high sulfur concentrations at the grain boundaries of the primary structure, tending to prevent the primary grain structure from undergoing such grain growth as would interfere with subsequent secondary recrystallization. Thus a finely grained matrix is maintained until secondary grains of cube-on-edge orientation begin to consume the grains of other orientations. Thereafter, as the temperature rises further, secondary grain growth will proceed by grain boundary energy and will convert the fine-grain matrix into a well developed cube-on-edge structure.

It follows from this explanation that instead of including sulfur or a sulfur-bearing compound in the annealing separator, comparable results may be achieved by charging the annealing atmosphere with hydrogen sulfide or any other gaseous sulfur compound, sulfur dioxide, sulfur hexafluoride and the like, which would react at the grain boundaries at temperatures of about 1000° F. or higher. This may be done during the primary grain growth period which occurs during the heating of the material up to the temperature at which secondary recrystallization occurs in a final anneal. It has been found that selenium or hydrogen selenide behaves similarly to sulfur or hydrogen sulfide, although these substances are more expensive.

In yet another variant procedure, the sulfur or sulfur-bearing compound may be made available at the surfaces of the sheet material during a decarburizing anneal prior to the final anneal. For example, if a silicon-iron strip is moved through an elongated furnace containing a special atmosphere for removing carbon, it is possible to mix hydrogen sulfide with the decarburizing atmosphere to control grain growth during the primary grain growth stage occuring as part of the decarburizing treatment, or, as more specifically taught hereinafter, to form a controlled iron sulfide layer on the material which will diffuse into the grain boundaries and inhibit the primary grain growth which continues during the subsequent final anneal. The atmosphere for decarburizing is ordinarily wet hydrogen, which is oxidizing to silicon but relatively non-oxidizing to iron.

Nevertheless, in the manufacture of thin silicon-iron sheet stock as herein defined the behavior of sulfur is similar to that broadly outlined in the copending application. However, factors previously unknown have been found to affect the diffusion of sulfur. It has now been discovered that there is a relationship between the amount of sulfur added and the cold work done on the material, in particular the cold reduction immediately preceding the final primary recrystallization. Also, it has been discovered that there is a relationship between the manganese content of the silicon-iron and the amount of sulfur or sulfur compound necessary to promote secondary recrystallization.

In a typical procedure in accordance with this invention, the silicon-iron is hot rolled from an ingot or slab to an intermediate gauge. The intermediate gauge may be varied depending upon the desired final gauge and the amount of cold work contemplated. But those skilled in the art will understand that the intermediate hot rolled gauge can be so chosen that silicon-iron will be reduced to a thickness of 7 mils or less in two or more stages or even in one stage of cold rolling. The hot rolled material at the intermediate gauge may be subjected to an anneal, such as a strip anneal at around 1675° F. or slightly higher for about two minutes, and is then pickled to remove the hot mill scale. It is then cold rolled. Where two stages of cold rolling are employed there will be a short-time intermediate strip anneal at a temperature of about 1400° F. to 1800° F., preferably about 1675° F. An atmosphere containing sufficient hydrogen to prevent oxidation on the surface of the steel may be employed for this anneal if desired. If a bright annealing is not utilized, then the material will be pickled after the intermediate anneal.

In many instances it will then be cold rolled a second time so as to reduce it to final gauge. If a single cold rolling stage is practiced, the percentage reduction should preferably be between 70 and 85%, or between 75% and 80% for the best results. A range of about 60% to about 80% of cold rolling reduction should be practiced in the final cold rolling stage of a process involving two or more cold rolling stages. This amount of cold reduction is considerably greater than that of prior practices in which reductions of about 50% were considered optimum.

It is most convenient to decarburize the material after the final cold rolling stage, although an earlier decarburization, e.g. in an intermediate anneal, may be practiced if desired. The preferred decarburization is in accordance with the previously mentioned teachings of the Carpenter and Jackson patent which involves, by way of example, a strand anneal at a temperature of about 1500° F. in a wet atmosphere such as one having a dew point of about 130° F. and containing sufficient hydrogen to prevent oxidation of the iron. The atmosphere while reducing to iron is preferably oxidizing to silicon as well as to carbon. Thus a thin layer of silica embedded in iron is produced on the surface of the material.

The decarburized stock is then cut into sheets which are stacked, or is wound into coils, with the interposition of an annealing separator between the sheets or convolutions. As set forth above, this separator may be varied, but is preferably of the magnesia type. Magnesium hydroxide in slurry form may be used, and elemental sulfur or a decomposable sulfur compound such as copper sulfide, iron sulfide, and the like may be added. If a slurry of magnesium hydroxide is employed, the silicon-iron sheet or strip material will preferably be subjected to a drying treatment. Care must be taken to prevent heating the coating to a temperature high enough to remove sulfur. A temperature of a few hundred degrees F. is satisfactory. Alternatively elemental sulfur or a decomposable sulfur compound may be added to dry magnesium oxide in finely divided form, and this may be imposed upon the surfaces of the silicon-iron in any desired way, e.g. by dusting or by electrostatic deposition.

Instead of adding sulfur or a decomposable sulfur compound of the annealing separator, sulfur compositions may be added to the annealing atmosphere. Hydrogen sulfide may be added to the atmosphere during decarburization, and if this is done it should be added in such quality that a film of iron sulfide at least about .01 mil thick is formed on the stock. Hydrogen sulfide or other gaseous sulfur-bearing compounds may be added to the atmosphere during the final box anneal providing the anneal is carried on under such circumstances that there is a flow of the atmosphere over the surfaces of the silicon-iron, as in open coil annealing. The amount of hydrogen sulfide present at the surfaces of the silicon-iron during the final box anneal should generally be between 770 and 3500 p.p.m. If the sulfur is added via the atmosphere, an annealing separator of pure magnesia may be used. It does not depart from the spirit of the invention to add sulfur both to the annealing atmosphere and to the annealing separator. If sulfur is added to the annealing separator, it should be in an amount of from .25% to 10% of the weight of the separator, depending upon the thickness and manganese content of the silicon-iron. The above values are based on a normal weight of coating of about .03 oz. per square foot of silicon-iron (both sides of the sheet).

As will be understood by one skilled in the art, the final anneal combines both a primary and a secondary recrystallization, inasmuch as primary recrystallization will occur at temperatures above the recrystallization point and extending into the range of about 1800° F. to 1900° F., whereas secondary recrystallization may start in the higher part of this range and continue while the temperature of the metal is raised, say, to 2100° F. to 2300° F. The atmosphere used during the final primary and secondary recrystallizations is generally an atmosphere containing hydrogen, and is usually pure hydrogen, dissociated ammonia or mixtures of the two. The atmosphere will be dry, as conventionally used for the final anneal of silicon-iron, so as to prevent undue oxidation of the constituents of the silicon-iron. Nevertheless, as has been pointed out, some silicon will have been oxidized to silica at or adjacent the surfaces of the silicon-iron; and at the high temperatures ultimately reached, this silica will fuse with some of the magnesia forming a thin adherent coating of glass on the surfaces of the silicon-iron.

It has been indicated that excellent results are obtained when the silicon-iron is reduced by cold rolling from an intermediate hot rolled gauge in a single stage with a reduction of about 70% to 85%. The permeability of the final product falls off drastically when the cold reduction exceeds about 85%.

It will be understood that the term "addition of sulfur" as used above may contemplate the use of sulfur or a sulfur-bearing compound either in the decarburizing or in the annealing atmosphere, or preferably in the annealing separator. In all cases, as explained in the copending application, sulfur is actually absorbed by the sheet stock and appears to be concentrated in the grain boundaries.

When no sulfur is added it will generally not be possible to obtain satisfactory secondary recrystallization in a material thinner than about 8 mils irrespective of the manganese content.

FIG. 1 shows that the shaded area of satisfactory secondary grain growth upon the addition of 1% sulfur tends to peak substantially opposite the .05% manganese value. The thinnest material which undergoes secondary grain growth is about 3 mils thick. The manganese content of the material is critically low.

Figure 2:
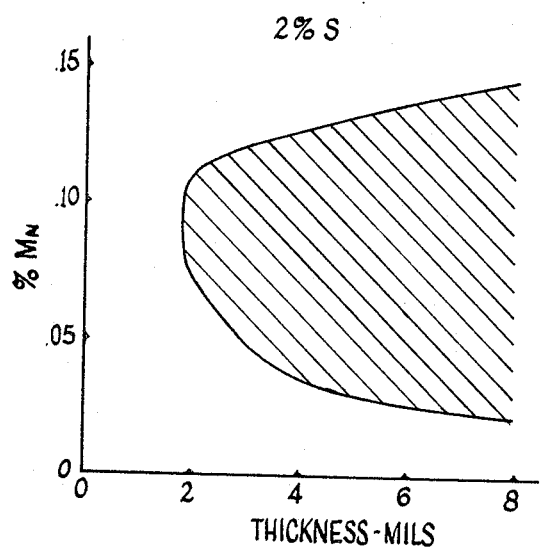
Figure 3:
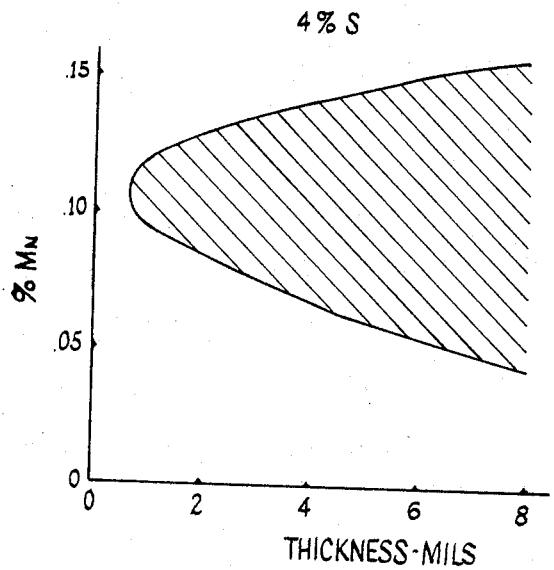
Figure 4:
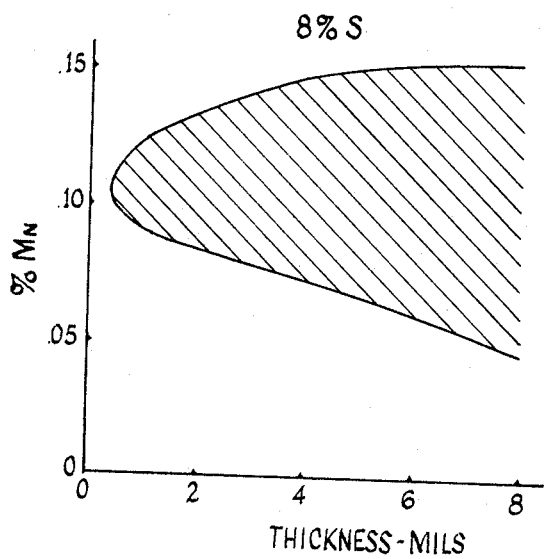

In FIG. 2, with 2% sulfur added the shaded area has broadened in a vertical direction and it is possible to obtain satisfactory secondary recrystallization in thin silicon-iron at thicknesses as low as about 2 mils and at manganese contents ranging substantially from .03 to about .13%. The permissible manganese range broadens somewhat at greater final thicknesses of the product.

FIGS. 3 and 4 again show shaded areas forming peaks roughly opposite the .10% manganese value. But the peaks of the shaded areas approach the ordinate line much more closely, indicating that satisfactory grain growth can be obtained even in very thin silicon-irons containing about .10% manganese when from about 4% to 8% of sulfur is added to the annealing separator.

Figure 5:
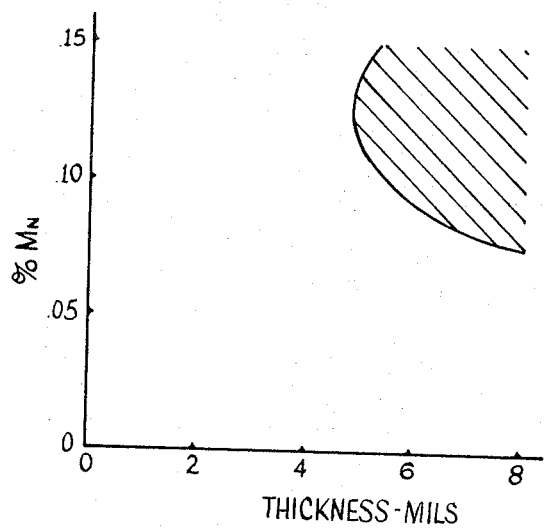

In FIG. 5 however, which indicates additions of about 12% sulfur, the shaded area has begun again to recede toward the right, indicating that the thinner materials can no longer be successfully manufactured.

It should be noted that the above described figures do not take into account several factors which can shift somewhat the areas of secondary growth. Among these factors are variations in the amounts of elements other than manganese and sulfur, and the conditions under which the anneals are conducted, such as the atmosphere and its access to the surfaces of the silicon-iron. Departures from the exact shape of the curves on these charts may occur due to the above mentioned variations, but the charts furnish an accurate indication of secondary grain growth as affected by the variables in the charts themselves.

*Example 1.—Process for making 6 mil*

(1) A coil was hot rolled to .076" from an initial temperature of 2550° F. The chemistry of the hot roll band was as follows:

|   | Percent |
|---|---|
| Carbon | .027 |
| Manganese | .081 |
| Sulfur | .024 |
| Silicon | 3.16 |

(2) The hot band was initally strip annealed at 1675° F. for about two minutes and then pickled free of hot mill scale.

(3) The annealed hot band was cold reduced to .0205".

(4) This intermediate gauge stock was strip annealed at 1675° F. for about one minute and then pickled.

(5) The intermediate gauge stock was cold reduced more than 70% to a final gauge of .006".

(6) The 6 mil material was decarburized in a strip anneal at 1500° F. for 1.5 minutes in hydrogen having a dew point of 130° F.

(7) The material was coated with an aqueous slurry containing 2% sulfur added to pure MgO, and the coating was dried under low heat.

(8) The material was box annealed in a hydrogen atmosphere at 2150° F. for sixteen hours.

(9) Magnetic test results were:

| Permeability at H10 oersteds | 1,820 |
|---|---|
| Watt losses, w./#: | |
| P15:60 | .503 |
| P15:400 | 6.56 |
| Grain size | ASTM 4 at IX |

*Example 2.—Process for making 4 mil*

(1) A coil was hot rolled from an initial temperature of 2550° F. to .076". The chemistry was as follows:

|   | Percent |
|---|---|
| Carbon | .026 |
| Manganese | .085 |
| Sulfur | .027 |
| Silicon | 3.11 |

(2) The hot band was initially annealed at 1675° F. for about two minutes and then pickled free of hot mill scale.

(3) The annealed hot band was cold reduced to .0195".

(4) The intermediate gauge stock was strip annealed at 1675° F. for about one minute and then pickled.

(5) The intermediate gauge stock was cold reduced about 80% to a final thickness of .004".

(6) The 4 mil material was decarburized for one minute at 1500° F. in hydrogen having a dew point of 130° F.

(7) The material was coated with an aqueous slurry containing 2% sulfur added to pure MgO and the coating was dried under low heat.

(8) The material was box annealed in a hydrogen atmosphere at 2150° F. for sixteen hours.

(9) Magnetic test results were:

| Permeability at H10 oersteds | 1,800 |
|---|---|
| Watt losses, w./#: | |
| P15:60 | .488 |
| P15:400 | 6.03 |
| Grain size | ASTM 5 at IX |

*Example 3.—Process for making 2 mil*

(1) A coil had been hot rolled to .070" from an initial temperature of 2550° F. The chemistry was as follows:

|   | Percent |
|---|---|
| Carbon | .025 |
| Sulfur | .024 |
| Manganese | .071 |
| Silicon | 2.98 |

(2) The hot band was annealed at 1675° F. for about two minutes and then pickled free of hot mill scale.

(3) The band was then cold reduced to .0190".

(4) The intermediate gauge stock was strip annealed at 1675° F. for about one minute.

(5) The annealed strip was cold reduced to .009".

(6) The 9 mil stock was strip annealed at 1675° F. for about one minute and then pickled.

(7) The 9 mil strip was cold reduced about 80% to a .0019" final thickness.

(8) The 1.9 mil stock was decarburized at 1500° F. for about thirty seconds in 130° F. dew point hydrogen.

(9) The decarburized stock was coated with an aqueous slurry containing 2% sulfur and 99% pure magnesia, and the coating was dried under low heat.

(10) The strip was box annealed at 2150° F. for sixteen hours in hydrogen.

(11) The magnetic properties were:

| Permeability at H10 oersteds | 1,790 |
|---|---|
| Watt losses, w./#: P15:400 | 5.64 |
| Grain size | ASTM 2 at IX |

It will be understood by the skilled worker in the art that the present process saves at least three steps from the process of the Littmann et al. Patent 2,473,156 previously mentioned, which hitherto has been the only available commercial method of making silicon-iron sheet stock in thicknesses less than about 7 mils. Moreover, the product of this application can be made to bear the desirable glass coating.

Modifications may be made in the invention without departing from the spirit of it.

The embodiments of the invention in which an exclusive property or privilege is claimed are defined as follows:

1. In a process of producing cube-on-edge oriented silicon-iron stock containing from about 2% to about 3.5% silicon and comprising the steps of hot reducing the silicon-iron, removing the scale, cold rolling to final gauge, and subjecting said stock to a final anneal consisting of a primary grain growth stage and a secondary grain growth stage; the improvement comprising the steps of providing said sheet stock with an initial manganese content from about .03% to about .15%, cold rolling said stock to a final thickness of about 7 mils and less, providing a grain growth inhibitor in the environment of the stock during said primary grain growth stage and diffusing said inhibitor into the grain boundaries of said stock during said primary grain growth stage, whereby to favor the growth of cube-on-edge oriented nuclei during said secondary grain growth stage, said inhibitor being chosen from the class consisting of sulfur, selenium and compounds thereof, and adjusting the quantity of said inhibitor in proportion to the said manganese content and the final thickness of said stock.

2. The process claimed in claim 1 wherein said inhibitor is provided in part at least during said primary grain growth stage by the use in the annealing atmosphere of from about 770 p.p.m. to about 3500 p.p.m. of said inhibitor, said inhibitor being chosen from the class consisting of hydrogen sulfide, hydrogen selenide, sulfur dioxide and sulfur hexafluoride.

3. The process claimed in claim 1 wherein an annealing separator containing magnesia is provided in contact with the surfaces of said stock during said final anneal.

4. The process claimed in claim 1 in which the cold reduction of the silicon-iron is carried on in a single stage with the reduction of about 70% to about 85%.

5. The process claimed in claim 1 in which the cold reduction of the silicon-iron is carried on in two stages with an intermediate anneal with a final reduction of from 60% to 80%.

6. The process claimed in claim 1 in which the cold reduction of the silicon-iron is carried on in three stages with two intermediate anneals and with a final reduction of from 60% to 80%.

7. The process claimed in claim 1 wherein a decomposable sulfur compound is exposed to the surfaces of the silicon-iron during the decarburization step and in which the quantity of sulfur so added to the silicon-iron is sufficient to form on the surfaces of the silicon-iron a layer of iron sulfide at least about .01 mil in thickness.

8. The process claimed in claim 1 wherein a decomposable sulfur compound is exposed to the surfaces of the silicon-iron during the decarburization step and in which the quantity of sulfur so added is sufficient to form on the surfaces of the silicon-iron a layer of iron sulfide at least about .01 mil in thickness, and in which the surfaces of the silicon-iron are covered with an annealing separator containing magnesia after the said decarburizing step.

9. The process claimed in claim 1 wherein the surfaces of the silicon-iron are coated with an annealing separator containing magnesia and from about .25% to about 10% of said inhibitor.

10. Cube-on-edge oriented silicon-iron sheet stock containing about 2% to about 3.5% silicon, having a thickness of 7 mils and less, made by the process defined in claim 1.

11. The product claimed in claim 10 having on its surfaces a thin glass coating formed during said secondary grain growth stage.

References Cited

UNITED STATES PATENTS

| | | | |
|---|---|---|---|
| 2,867,558 | 1/1959 | May | 148—111 |
| 3,090,711 | 5/1963 | Kohler | 148—111 |
| 3,130,093 | 4/1964 | Kohler | 148—111 |
| 3,130,094 | 4/1964 | Kohler et al. | 148—111 |
| 3,130,095 | 4/1964 | Kohler et al. | 148—113 |
| 3,152,930 | 10/1964 | Foster | 148—113 |

OTHER REFERENCES

Kohler: J. of Applied Physics, Supplement to vol. 31, No. 5, May 1960, pp. 408S–409S.

DAVID L. RECK, *Primary Examiner.*

N. F. MARKVA, *Assistant Examiner.*